United States Patent
Dawson

(10) Patent No.: US 6,976,127 B2
(45) Date of Patent: Dec. 13, 2005

(54) MEMORY SYSTEM, COMPUTER SYSTEM, PROCESSING UNIT AND METHOD

(75) Inventor: Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 210 days.

(21) Appl. No.: 10/619,045

(22) Filed: Jul. 14, 2003

(65) Prior Publication Data

US 2004/0015659 A1    Jan. 22, 2004

Related U.S. Application Data

(63) Continuation of application No. 09/797,458, filed on Mar. 1, 2001, now Pat. No. 6,604,175.

(51) Int. Cl.$^7$ ............................................. G06F 12/00
(52) U.S. Cl. ..................... 711/129; 711/134; 711/168
(58) Field of Search ................ 711/129–130, 133–134, 711/149–150, 159–160, 168, 170–173

(56) References Cited

U.S. PATENT DOCUMENTS

| | | | |
|---|---|---|---|
| 5,717,893 A | * | 2/1998 | Mattson ....................... 711/129 |
| 5,787,473 A | | 7/1998 | Vishlitzky et al. |
| 5,936,632 A | | 8/1999 | Cunniff et al. |
| 6,000,019 A | | 12/1999 | Dykstal et al. |
| 6,047,339 A | | 4/2000 | Su et al. |
| 6,115,793 A | | 9/2000 | Gruber et al. |
| 6,192,428 B1 | | 2/2001 | Abramson et al. |
| 6,272,598 B1 | * | 8/2001 | Arlitt et al. .................. 711/133 |
| 6,295,580 B1 | * | 9/2001 | Sturges et al. .............. 711/129 |
| 6,389,504 B1 | | 5/2002 | Tucker et al. |

* cited by examiner

Primary Examiner—Nasser Moazzami
(74) Attorney, Agent, or Firm—Mayer Fortkort & Williams PC; Heather L. Mansfield, Esq.; Karin L. Williams, Esq.

(57) ABSTRACT

A memory system includes a memory cache responsive to a single processing unit. The memory cache is arrangeable to include a first independently cached area assigned to store a first number of data packets based on a first processing unit context, and a second independently cached area assigned to store a second number of data packets based on a second processing unit context. A memory control system is coupled to the memory cache, and is configured to arrange the first independently cached area and the second independently cached area in such a manner that the first number of data packets and the second number of data packets coexist in the memory cache and are available for transfer between the memory cache and the single processing unit.

18 Claims, 5 Drawing Sheets

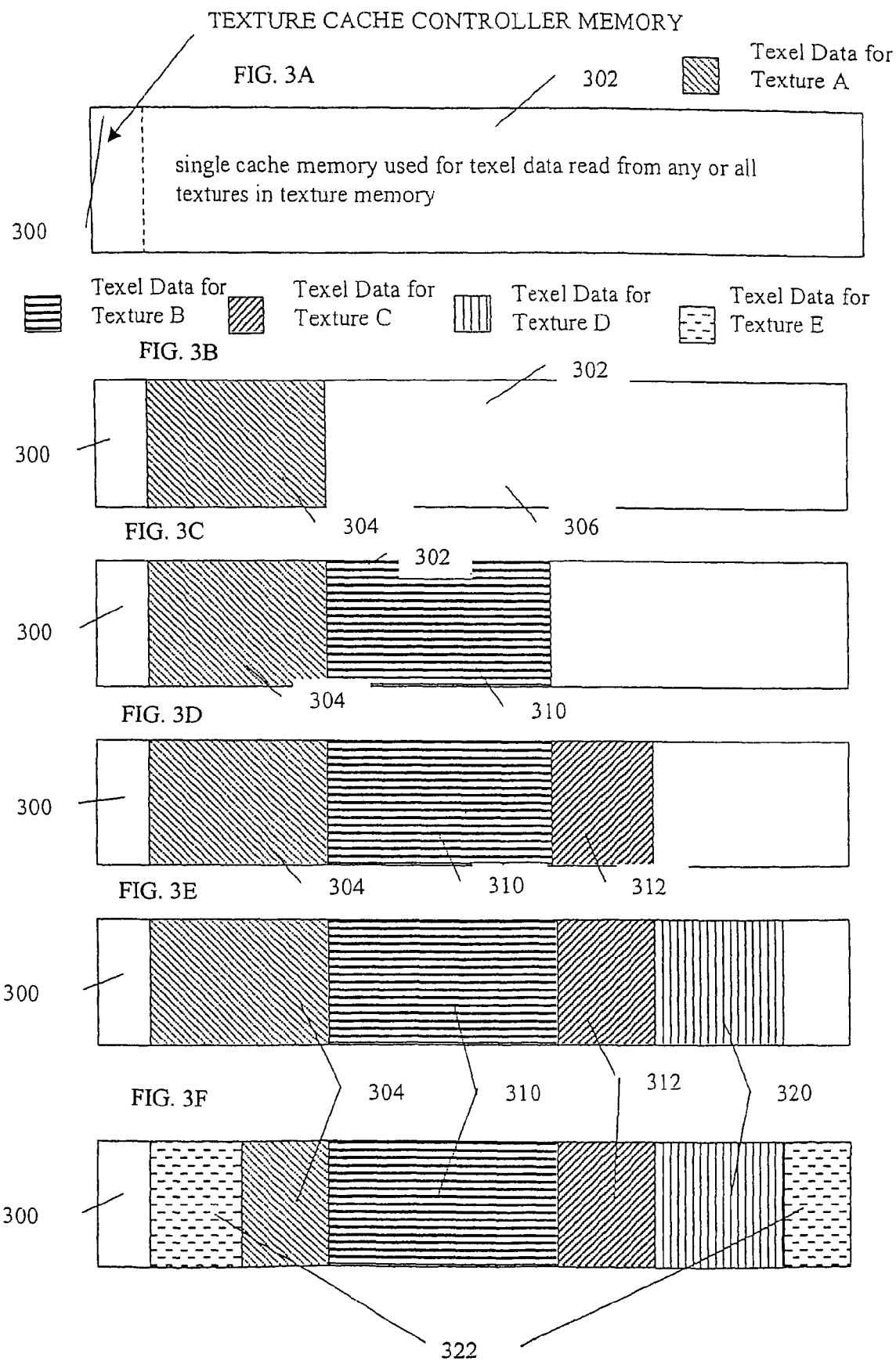

TEXTURE CACHE CONTROLLER MEMORY

▨ Texel Data for Texture A  ▭ Texel Data for Texture B  ▨ Texel Data for Texture C ▥ Texel Data for Texture D  ▭ Texel Data for Texture E  ▦ Texel Data for Texture F The width of the shaded area in each individual cache reflects the amount of texel data that may be used and re-used

| TEXTURE ID | LOCATION OF THE ICA 402 IN THE CACHE 166 | SIZE OF THE ICA | TEXTURE USAGE INDICATOR | CLOSED FLAG |
|---|---|---|---|---|
| 501B | | | | |
| 501C | | | | |
| 501D | | | | |
| 501E | | | | |
| 501F | | | | |

FIG. 5

MEMORY SYSTEM, COMPUTER SYSTEM, PROCESSING UNIT AND METHOD

BACKGROUND OF THE INVENTION

This application is a continuation of U.S. patent application Ser. No. 09/797,458, filed Mar. 1, 2001 by the same inventor, now U.S. Pat. No. 6,604,175, entitled "Improved Data Cache and Method of Storing Data By Assigning Each Independently Cached Area In The Cache To Store Data Associated With One Item."

1. Field of the Invention

The present invention relates to storing and retrieving data. Specifically, the present invention relates to storing data in a cache and retrieving data from the cache.

2. Description of the Related Art

In computer graphics, existing texture-rendering techniques map a pixel on a screen (typically using screen coordinates (x, y)) to a polygon, such as a triangle, on a surface in a viewing plane (typically using geometric or surface coordinates (s, t)). The polygon is rasterized into a plurality of smaller pieces called fragments. Each polygon may have information, such as color and/or a normal vector, associated with each vertex of the polygon. To assign a texture (i.e., a color pattern or image, either digitized or synthesized) to a fragment, the fragment is mapped onto a texture map (typically using texture coordinates (u, v)). A texture map represents a type of image, such as stripes, checkerboards, or complex patterns that may characterize natural materials. Texture maps are stored in a texture memory. A texture map comprises a plurality of texels. A texel is the smallest graphical element in a 2-D texture map used to render a 3-D object. A texel represents a single color combination at a specific position in the texture map.

Each texture map has a plurality of associated MIP (multum in parvo) maps, which are abbreviated versions of a full texture map. One of the MIP maps may be selected to provide a suitable resolution for the fragment of the polygon being rasterized. Several techniques exist to interpolate the desired color information from one or more MIP levels. These texel selection techniques are known technology. The final texture color derived from the selected MIP map is applied onto the fragment. The applied texture may be blended with a color already associated with the fragment or polygon.

In a traditional graphics rendering pipeline/architecture, a texturing unit will access a texture memory via a texture cache. This traditional architecture treats the texture cache as a single large cache or lookup table created from most of the memory available in the texture cache. A texture memory controller passes new texel data packets from all the texture maps to the single texture cache. Any texel data from any texture map may overwrite texel entries from other maps. There are no provisions for dealing with texel data packets that are frequently re-used compared to texel data packets that are used only intermittently or infrequently. A frequently re-used texel data packet may be written over, reloaded again, written over and then reloaded again repeatedly. The operation of having a single cache handle texel data from many texture maps is inefficient.

SUMMARY OF THE INVENTION

According to one aspect of the present invention, a memory system includes a memory cache responsive to a single processing unit. The memory cache is arrangeable to include a first independently cached area assigned to store a first number of data packets based on a first processing unit context, and a second independently cached area assigned to store a second number of data packets based on a second processing unit context. A memory control system is coupled to the memory cache, and is configured to arrange the first independently cached area and the second independently cached area in such a manner that the first number of data packets and the second number of data packets coexist in the memory cache and are available for transfer between the memory cache and the single processing unit.

According to another aspect of the present invention, a method includes providing a memory control system to control a memory cache responsive to a single processing unit; allocating a first portion of the memory cache to store a first number of data packets associated with a first processing unit context, to form a first independently cached area; allocating a second portion of the memory cache to store a second number of data packets associated with a second processing unit context, to form a second independently cached area; arranging transfer of at least some of the first number of data packets between the memory cache and the single processing unit; and arranging transfer of at least some of the second number of data packets between the memory cache and the single processing unit, the first number of data packets and the second number of data packets being coexistent in the memory cache.

According to a further aspect of the present invention, a computer system includes a bus; a central processing unit coupled to the bus; a system memory coupled to the central processing unit; a memory cache coupled to the central processing unit, the memory cache arrangeable to include a first independently cached area assigned to store a first number of data packets associated with a first process executable by the central processing unit; and a second independently cached area assigned to store a second number of data packets associated with a second process executable by the central processing unit. A memory control system is coupled to the memory cache, the memory control system configured to arrange the first independently cached area and the second independently cached area in such a manner that the first number of data packets and the second number of data packets coexist in the memory cache and are concurrently available for transfer between the memory cache and the central processing unit. A computer-readable storage medium may have stored thereon one or more software programs which, when executed, implement the foregoing method.

According to a still further aspect of the present invention, a processing includes a central processing engine operative to alternately execute a first process and a second process; and a memory control interface to communicate with the central processing engine, the memory control interface operative to respond to a memory cache. The memory cache is arrangeable to include a first independently cached area assigned to store a first number of data packets associated with the first process; and a second independently cached area assigned to store a second number of data packets associated with the second process, the first number of data packets and the second number of data packets coexisting in the memory cache. When alternately executing the first process and the second process, the central processing engine is operative to cause the memory control interface to arrange for transfer of the first number of data packets and the second number of data packets, respectively, between the memory cache and the central processing engine, and the first number of data packets and the second number of data packets are concurrently available for transfer.

BRIEF DESCRIPTION OF THE DRAWINGS

FIG. 3A illustrates one embodiment of a traditional memory allocation for the texture cache in the texturing system of FIG. 1.

FIGS. 3B–3F illustrate exemplifying mapping configurations of the texture cache in FIG. 3A after a plurality of retrieved texel data packets have been written by the texture memory controller of FIG. 1.

FIG. 5 illustrates one embodiment of texture cache control registers used by the texture memory and cache controller in FIG. 1.

DETAILED DESCRIPTION

Figure 1:
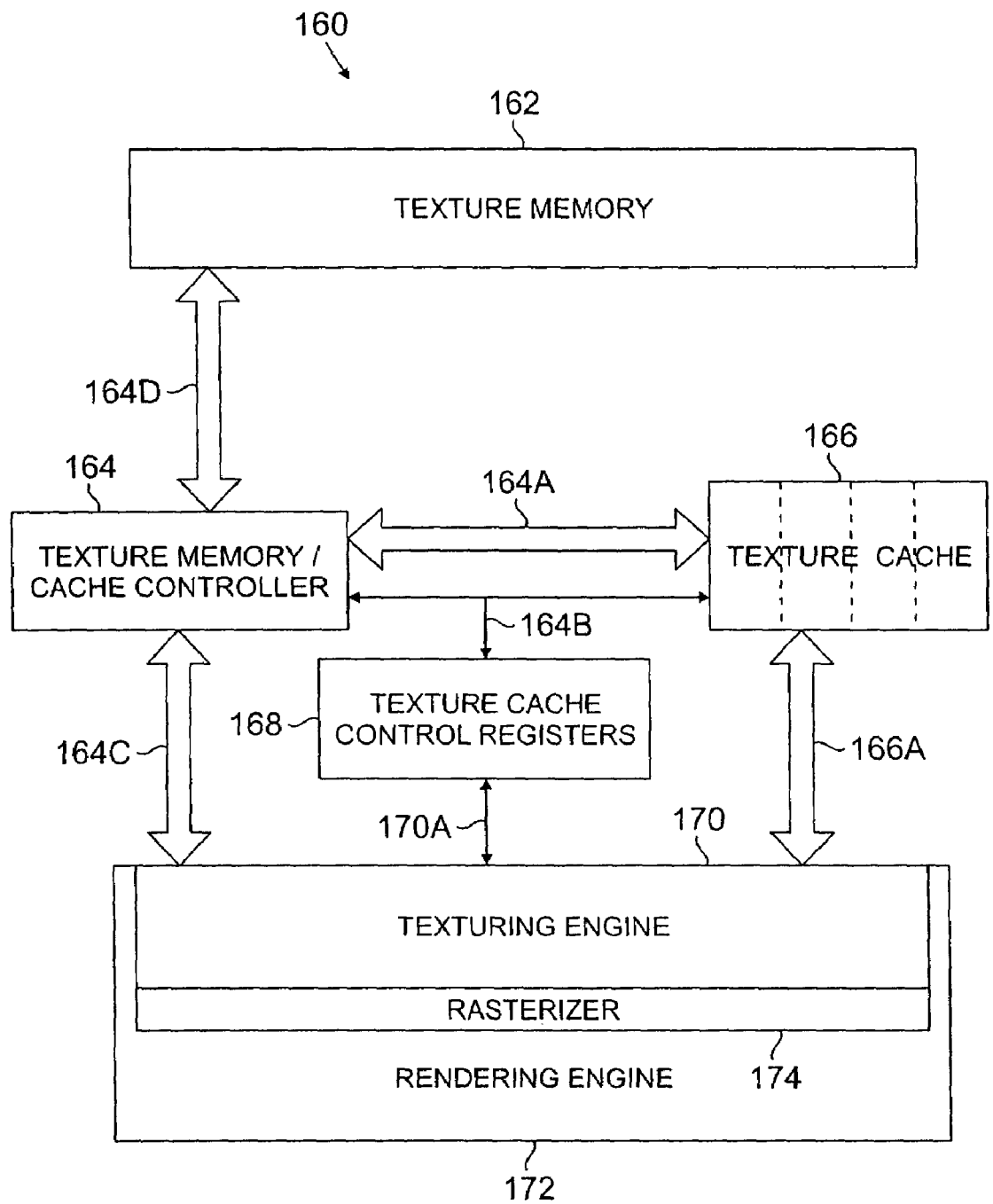
FIG. 1 illustrates one embodiment of a texturing system in accordance with the present invention.

FIG. 1 illustrates one embodiment of a texturing system 160 in accordance with the present invention. The texturing system 160 comprises a texture memory 162, a texture memory and cache controller 164 (hereinafter referred to as texture memory controller 164), a texture cache 166, a set of texture cache control registers 168, a texturing engine 170, a rasterizer 174, and a rendering engine 172.

Various types of memories, caches, controllers, registers and/or processing components may be used in accordance with the present invention. The scope of the present invention is not limited to a particular type of memory, cache, controller, register and/or processing component. Various embodiments of the texturing system 160 may comprise other components in addition to or instead of the components shown in FIG. 1 without departing from the scope of the invention. For example, the texturing system 160 may comprise additional memories, caches, controllers, registers and/or processing components.

The components shown in FIG. 1 may be implemented with software, hardware or a combination of software and hardware. In one embodiment, the texturing system 160 is part of a hardware-based graphics rendering system, where the texture memory 160 is 'off-chip,' and the rest of the components in FIG. 1 are implemented with an Application Specific Integrated Circuit (ASIC) chip or a Field Programmable Gate Array (FPGA). The texture memory 162 in FIG. 1 may comprise an EEPROM, DRAM, SDRAM, flash memory or other suitable storage unit. Similarly, the texture cache 166 may comprise an EEPROM, DRAM, SDRAM, flash memory or other suitable storage unit. In one embodiment, the texture cache 166 is implemented on-chip with the texturing engine 170.

The texture memory controller 164 in FIG. 1 may comprise a microcontroller with firmware or be included as part of a larger ASIC or FPGA. The texture cache control registers 168 may comprise an array of registers. In one embodiment, the texture cache control registers 168 are implemented in the texture memory controller 164. The texturing engine 170, rasterizer 174 and rendering engine 172 may be separate or an integrated unit. The texturing engine 170, rasterizer 174 and rendering engine 172 may comprise an integrated circuit with a microcontroller and firmware.

The components in FIG. 1 are coupled to each other by a plurality of lines 164A, 164B, 164C, 164D, 166A, 170A. Each line 164A, 164B, 164C, 164D, 166A, 170A may comprise a single line, a plurality of lines, a bus, a combination of single lines and buses, or some other suitable type of address and/or data transfer means.

Figure 2:
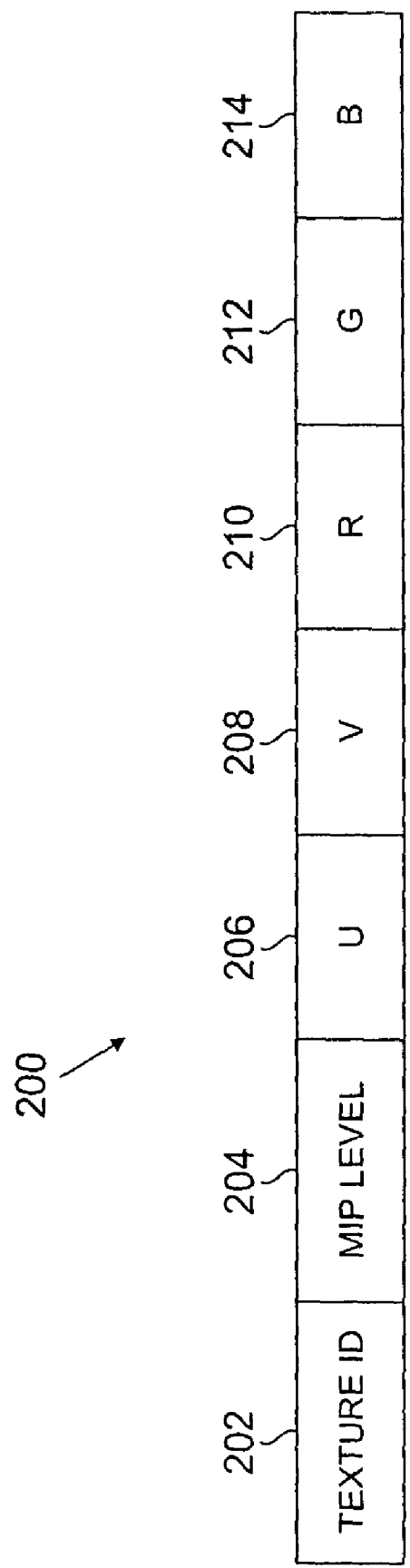
FIG. 2 illustrates one embodiment of a texel data packet stored in the texture memory of FIG. 1.

In operation, the texture memory controller 164 of FIG. 1 receives new textures sent by a host computer (not shown) with pre-set attributes for each texture. The texture memory controller 164 stores the new textures in the texture memory 162 via line 164D. FIG. 2 illustrates one embodiment of a texel data packet 200 (referred to herein individually or collectively as '200') stored in the texture memory 162 of FIG. 1. Each packet 200 in FIG. 2 contains enough information to uniquely identify the color for an individual texel within a particular MIP level that is a member of a particular texture. Each texel data packet 200 comprises a texture ID field 202, a MIP level field 204, U, V fields 206, 208 and RGB fields 210–214. The texture ID field 202 identifies a texture (in the texture memory 162) from which a texel was read. The MIP level field 204 identifies a MIP level within the texture map (in the texture memory 162) from which the texel was read. The U, V fields 206, 208 are the texture coordinates within the MIP level from which the texel was read. The RGB fields 210–214 represent a texel color combination.

The texture memory controller 164 in FIG. 1 may pass a plurality of texel data packets 200 (FIG. 2) to the texture cache 166 via line 164A and to the texturing engine 170 via line 164C. The texture memory controller 164 uses the texture cache control registers 168 to store information about the texel data packets 200, such as the memory locations of the texel data packets 200 in the texture cache 166.

Figure 4A:
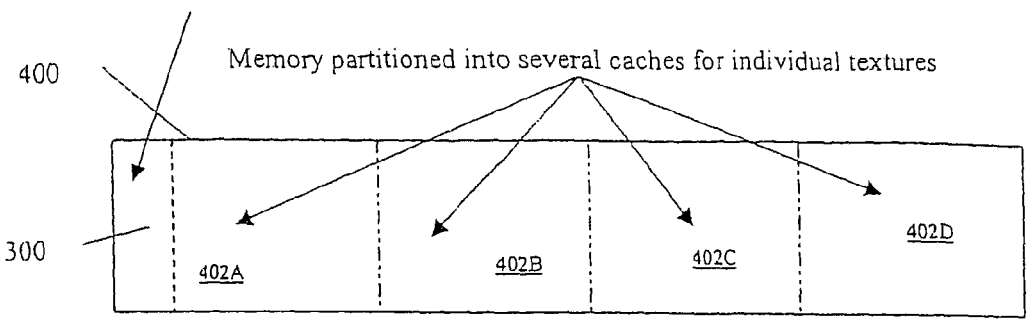
FIG. 4A illustrates one embodiment of a memory allocation for the texture cache in the texturing system of FIG. 1 in accordance with the present invention.

In one embodiment (described below with reference to FIG. 4A), the texture memory controller 164 removes the texture ID 202 (FIG. 2) from each packet 200 before storing the packet 200 in the texture cache 166. In FIG. 4A, each independently cached area (ICA) 402 is assigned to store texel data packets 200 for a particular texture, so the texture ID 202 in each texel data packet 200 is not needed.

The texture cache 166 of FIG. 1 stores texel data packets 200 (FIG. 2) that have been recently accessed by the texture memory controller 164. The texture cache 166 may store texels from multiple textures for a scene, such as textures for a ceiling, a floor and a throne, of a throne room in a computer game. Each texture is assigned to one ICA. The texture cache 166 may pass texel data packets 200 to the texturing engine 170 via line 166A.

FIG. 3A illustrates one embodiment of a traditional memory allocation for the texture cache 166 in FIG. 1. In one embodiment, the texture cache 166 is a circular queue, but in other embodiments, the texture cache 166 is not a circular queue. Most of the memory available in the texture cache 166 in FIG. 3A is configured to be a single area of memory 302 used to store texel data packets 200 (FIG. 2). A small portion of memory 300 in the texture cache 166 in FIG. 3A may be set aside for the texture memory controller 164 to provide temporary storage for texels held back due to pending reads by the rendering engine. For example, the small portion of memory 300 may store the memory address locations of the awaiting texel data packets 200 in the texture memory 160.

In one embodiment, the texturing engine 170 (FIG. 1) sends a request for one or more texel data packets 200 (FIG. 2) to the texture memory controller 164 via line 164C. The texture memory controller 164 determines whether some or all of the requested textel data packets 200 are in the texture cache 302 (FIG. 3A). If some or all of the requested texel packets 200 are within the texture cache 302, the texture memory controller 164 provides memory location addresses of the texel data packet 200 in the texture cache 302 to the texturing engine 170. The texturing engine 170 then reads the texel data packet 200 from the specified memory locations in the texture cache 302. Alternatively, the texture memory controller 164 directs the texture cache 166 to pass the requested texel packets 200 to the texturing engine 170.

For example, the texturing engine 170 (FIG. 1) may request texel packets 200 (FIG. 2) that have been used in a previous rendering process, such as for example, in a multi-texturing or semi-opaque surface rendering process. The texture cache 166 provides the requested texel data packets 200 to the texturing engine 170 faster than the texture memory controller 164 retrieving the requested texel packets 200 from the texture memory 162.

If some of the requested texel packets 200 (FIG. 2) are not in the cache 302 (FIG. 3A), then the texture memory controller 164 (FIG. 1) retrieves the requested texel packets 200 from the texture memory 162 via line 164D. The texture memory controller 164 passes the retrieved texel data packets 200 to the texture cache 302 via line 164A and the texturing engine 170 via line 164C. Alternatively, the texture cache 166 may pass the retrieved texel packets 200 to the texturing engine 170 via line 166A.

In one embodiment, the texture memory controller 164 (FIG. 1) sends an interrupt signal to the texturing engine 170 via line 164C to indicate when retrieved texel packets 200 (FIG. 2) are in the texture cache 302 (FIG. 3A) and ready for retrieval. The texturing engine 170 retrieves the texel packets 200 directly from the texture cache 166 or directs the texture memory controller 164 to provide memory location addresses of the texel data packet 200 in the texture cache 302 to the texturing engine 170. The texturing engine 170 then reads the texel data packet 200 from the specified memory locations in the texture cache 302.

The texture memory controller 164 in FIG. 1 places new texel data packets 200 (FIG. 2) in the cache 302 of FIG. 3A. FIGS. 3B–3F illustrate exemplifying memory configurations of the texture cache 166 in FIG. 3A after a plurality of retrieved texel data packets 200 (FIG. 2) have been written by the texture memory controller 164 (FIG. 1). In FIGS. 3B–3F, the cache 302 has been set up as simple circular queue, but other memory formats may be used.

In FIGS. 3B–3F, the textel data packets 200 in the conventional cache 302 may be associated with a plurality of different textures, such as textures labeled 'A–E,' in the texture memory 162. In other words, the single cache 302 stores texel data packets 200 for all textures in the texture memory 162 that are requested by the texturing engine 170. For example, the area 304 in cache 302 in FIG. 3B is storing texel data packets related to a first texture A that have been requested by the texturing engine 170 (FIG. 1). The remaining area 306 of the cache 302 in FIG. 3B is empty at the moment. In FIG. 3C, the area 304 is storing texel data packets related to the first texture A, and the area 310 is storing texel data packets related to a second texture B that have been requested by the texturing engine 170. In FIG. 3F, the area 322 is storing texel data packets related to a fifth texture E that have been requested by the texturing engine 170. As shown in FIGS. 3E and 3F, the texel data packets 200 of the fifth texture E have over-written some of the texel data packets 200 of the first texture A. Texel data packets 200 related to subsequent textures will over-write previously stored texel data packets.

In the traditional cache 302 shown in FIGS. 3A–3F, there are no provisions for dealing with texel data packets 200 (FIG. 2) that are frequently re-used by the texturing engine 170 (FIG. 1) compared to texel data packets 200 that are used only intermittently or infrequently. In FIGS. 3A–3F, a frequently re-used texel data packet 200 may be written over by the texture memory controller 164, reloaded again, written over and then reloaded again repeatedly. Thus, the operation of this type of cache 302 is inefficient. Even if the implementation is changed to use another method such as a multi-way associative cache the entire cache is still shared among all the texture maps and the inefficiency remains.

FIG. 4A illustrates one embodiment of a memory allocation for the texture cache 166 in FIG. 1 in accordance with the present invention. The memory allocation in FIG. 4A divides the texture cache 166 into a plurality of configurable Independently Cached Areas (ICAs) 402A–402D (referred to herein individually or collectively as '402'). Each ICA 402 is an independently mapped area that represents a dedicated cache. Each ICA 402 is assigned a configurable range of memory in the texture cache 166. Each ICA 402 stores texel data packets 200 (FIG. 2) associated with one texture in the texture memory 162. An ICA 402 may be implemented as anything from a simple circular queue to a set of lookup tables to a multi-way associative cache. The methodology and techniques used to implement what happens within an ICA may vary.

Although only four ICAs 402A–402D are shown in FIGS. 4A–4F, the texture cache 166 may have two or more configurable ICAs 402. The memory allocation in FIG. 4A solves the problem discussed above by reusing ICAs 402 for textures that are not being heavily used.

FIGS. 4B–4F illustrate exemplifying ICA configurations of the texture cache 166 in FIG. 4A after a plurality of retrieved texel data packets have been written by the texture memory controller 164 of FIG. 1. The texture memory controller 164 uses control registers 168 (FIG. 5) to map texel data packets 200 (FIG. 2) associated with different textures in the texture memory 162 (FIG. 1) to different ICAs 402A–402D (FIG. 4A) in the texture cache 166.

FIG. 5 illustrates one embodiment of an array 168 of texture cache control registers 501A–501F (referred to hereinafter individually or collectively as '501') used by the texture memory controller 164 (FIG. 1) to control the usage of the ICAs 402A–402D in FIG. 4A. Each register 501 in FIG. 5 is associated with a particular ICA 402 in FIG. 4A. Each register 501 in FIG. 5 comprises a texture ID field 502, which assigns texel data packets 200 (FIG. 2) associated with a particular texture to a particular ICA 402. If a texture in the texture memory 162 is not yet associated with an ICA 402 (FIG. 4A) in the texture cache 166, then the texture ID field 502 has a NULL entry.

Each register 501 in FIG. 5 comprises a memory location address 504 of the beginning of the ICA 402 in the texture cache 166 (FIG. 1). For example, the memory location address 504 may be an address offset from the beginning of the texture cache memory. Each register 501 comprises a size field 506 of an ICA 402. Each register 501 comprises a plurality of fields to indicate information, such as a texture usage indicator 508 and a 'CLOSED' flag 510. An asserted CLOSED flag 510 indicates when an ICA 402 will not accept any more texel data packets 200 (FIG. 200).

The texture usage indicator 508 (referred to herein individually and collectively as '508') in FIG. 5 may be configured to have any number of bits. The texture usage indicator 508 may be incremented or decremented using simple ASIC/FPGA integer ADD and SUBTRACT operations. When a texel data packet 200 (FIG. 2) is read from an ICA 402 (FIG. 4A), the texture usage indicator 508 related to that particular ICA 402 is incremented, and the texture usage indicators 508 related to the other ICAs 402 are decremented. In one embodiment, this increment/decrement feature is limited to those ICAs 402 that have assigned textures. In another embodiment, the increment/decrement feature is not limited to ICAs 402 that have assigned textures. The texture usage indicators 508 have a lower limit value, such as zero, and a configurable upper limit value, such as 255. Wrap-around is preferably not allowed.

A texture that is frequently used by the texturing engine 170 (FIG. 1) will have a significant texture usage indicator value associated with the texture's ICA 402. A texture that is rarely used by the texturing engine 170 will have a texture usage indicator value hovering around zero. If texel use is substantially even across all textures, then all of the usage indicators 508 will be around zero.

In one embodiment mentioned above, the texture ID 202 (FIG. 2) is removed before each texel data packet 200 is stored in an ICA 402 (FIG. 4A) of the texture cache 166 (FIG. 1). Thus, a texture ID is associated with an entire ICA 402 and not associated with an individual texel. By storing texel data packets 200 without a texture ID field 202, more cache memory in the ICAs 402A–402D is available to store textel data packets 200. In contrast, a texture cache 166 in FIG. 3A requires each textel data packet 200 to have a texture ID field 202.

Figure 4B:
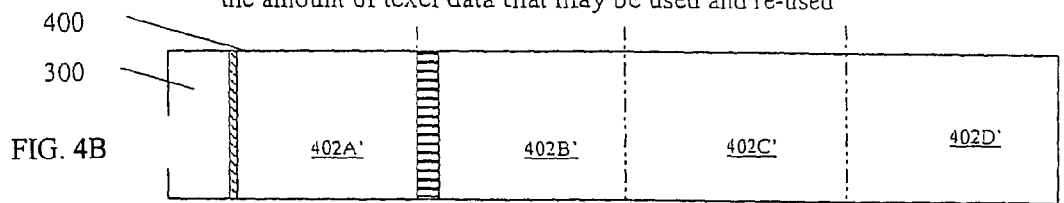
FIGS. 4B–4F illustrate exemplifying configurations of the texture cache in FIG. 4A after a plurality of retrieved texel data packets have been written by the texture memory controller of FIG. 1.
Figure 4C:
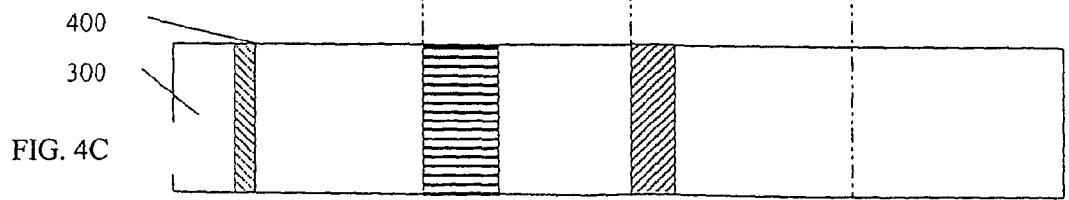

When the texturing engine 170 (FIG. 1) requests a texel data packet 200 (FIG. 2) for a texture that is not assigned to an ICA 402 (FIG. 4A) in the texture cache 166 (FIG. 1), the texture memory controller 164 determines whether all of the ICAS 402A–402D in the texture cache 166 are currently assigned to a texture. If there is an available ICA 402 (not assigned to a texture), that ICA 402 is assigned to the new texture and holds texel data packets 200 associated with the new texture. For example, FIG. 4A shows available ICAs 402A–402D, and FIG. 4B shows available ICAs 402C' and 402D'.

Figure 4D:
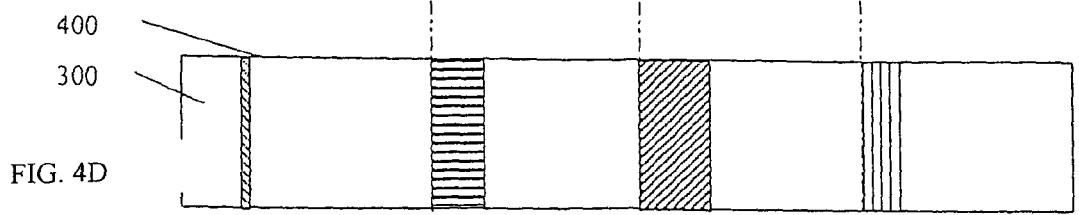

If all of the ICAs 402A–402D have assigned textures, such as FIG. 4D, a selection method (such as a round robin method) selects an ICA 402 that has a usage indicator value 508 (FIG. 5) at or near zero and a de-asserted CLOSED flag 510. For example, in FIG. 4D, the first cache 402A storing texel data packets 200 for texture A has a usage indicator value 508 (FIG. 5) at or near zero.

Figure 4E:
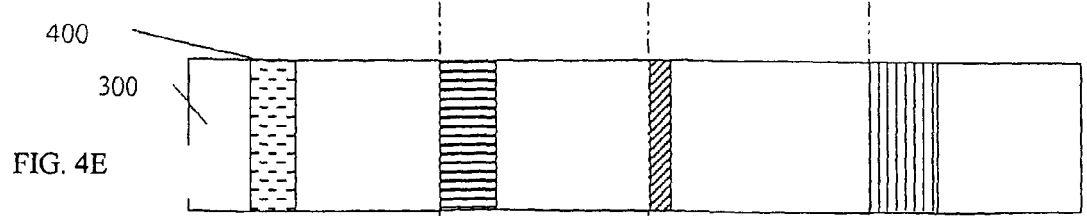
Figure 4F:
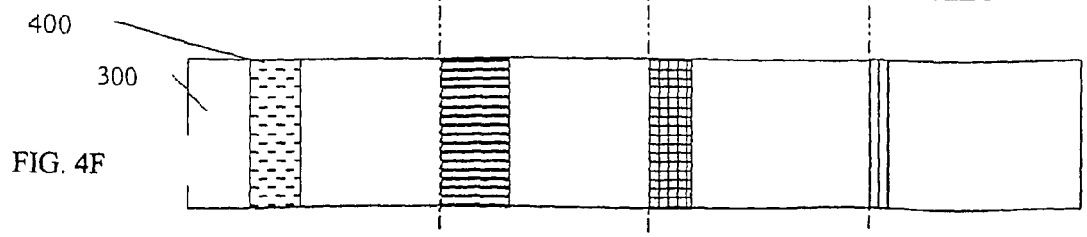

Once an ICA 402 is selected for the new texture, the CLOSED flag 510 of the selected ICA 402 is temporarily asserted to prevent (1) texel data packets 200 associated with the old assigned texture and (2) texel data packets 200 associated with the new texture to enter the selected ICA 402. When all pending read requests of old texel data packets 200 in that ICA 402 by the texturing engine 170 are complete or a certain time period has passed, the CLOSED flag 510 is de-asserted, the remaining packets 200 in the ICA 402 may be optionally erased, and the ICA 402 is assigned to store texel data packets 200 for the new texture. The texture memory controller 164 stores the texture ID of the new texture in the texture ID field 502 for that ICA 402. The texture memory controller 164 may then place texel data packets 200 related to the new texture in the assigned ICA 402A. Using the example above, FIG. 4E shows texel data packets of a new texture E stored in the first ICA 402A. FIG. 4F shows texel data packets of a new texture E stored in the third ICA 402C.

In another embodiment, the methods described above are applied to a CPU cache with ICAs, which are used to individually hold data on the basis of a thread, task or process. In addition, each ICA may be implemented as the type of N-way associative cache typically used by CPU designs.

The above-described embodiments of the present invention are merely meant to be illustrative and not limiting. Various changes and modifications may be made without departing from the invention in its broader aspects. The appended claims encompass such changes and modifications within the spirit and scope of the invention.

What is claimed is:

1. A memory system, comprising:
   a memory cache responsive to a single processing unit, the memory cache arrangeable to comprise:
   a first independently cached area assigned to store a first number of data packets based on a first processing unit context; and
   a second independently cached area assigned to store a second number of data packets based on a second processing unit context; and
   a memory control system coupled to the memory cache, the memory control system configured to arrange the first independently cached area and the second independently cached area in such a manner that the first number of data packets and the second number of data packets coexist in the memory cache and are available for transfer between the memory cache and the single processing unit,
   wherein the single processing unit comprises a central processing unit (CPU),
   wherein the first processing unit context comprises a first CPU process and the second processing unit context comprises a second CPU process, and
   wherein the first independently cached area is configurable in such a manner that at least some of the first number of data packets are transferable from the first independently cached area in response to execution of the first CPU process by the single processing unit, and wherein the second independently cached area is configurable in such a manner that at least some of the second number of data packets are transferable from the second independently cached area in response to execution of the second CPU process by the single processing unit.

2. The memory system according to claim 1, wherein the first number of data packets and the second number of data packets are concurrently available for bidirectional transfer between the memory cache and the single processing unit.

3. The memory system according to claim 1, wherein each data packet comprises a smallest unit of transaction handled by the memory cache.

4. The memory system according to claim 3, wherein each data packet comprises one of: a data word; a cache line and a number of bytes.

5. The memory system according to claim 1, wherein data packets are transferable between the memory cache and the single processing unit based on requests from the single processing unit to the memory control system.

6. The memory system according to claim 1, wherein the memory control system comprises:
   a first control register configured for association with the first independently cached area; and a second control register configured for association with the second independently cached area, the first and second control registers configured to store one of: a processing unit context assigned to the associated independently cached area; a memory location of the associated independently cached area in the memory cache; and a size of the associated independently cached area in the memory cache.

7. The memory system according to claim 6, wherein each of the first and second control registers is further configured to store a flag, the first number of data packets prohibited from entering the second independently cached area and the second number of data packets prohibited from entering the first independently cached area based on an assertion status of the flag.

8. A method, comprising:
providing a memory control system to control a memory cache responsive to a single processing unit;
allocating a first portion of the memory cache to store a first number of data packets associated with a first processing unit context, to form a first independently cached area;
allocating a second portion of the memory cache to store a second number of data packets associated with a second processing unit context, to form a second independently cached area;
arranging transfer of at least some of the first number of data packets between the memory cache and the single processing unit; and
arranging transfer of at least some of the second number of data packets between the memory cache and the single processing unit,
the first number of data packets and the second number of data packets being coexistent in the memory cache,
wherein data rackets are arranged for transfer between the memory cache and the single processing unit based on requests from the single processing unit to the memory control system, and
further wherein transfer of the at least some of the first and second number of data packets in response to execution of the first and second processes, respectively, does not require the first and second processes to recognize allocation of the first independently cached area or the second independently cached area.

9. A computer-readable storage medium having stored thereon one or more software programs which, when executed, implement die method of claim 8.

10. The method according to claim 8, wherein the single processing unit comprises a central processing unit (CPU).

11. The method according to claim 10, wherein the first and second processing unit contexts comprise one of: processes; threads; and tasks.

12. The method according to claim 11, further comprising:
arranging transfer of at least some of the first number data packets between the memory cache and the CPU in response to execution of a first process by the single processing unit; and
arranging transfer or least some of the second number of data packets between the memory cache and the CPU in response to execution of a second process by the single processing unit.

13. The method according to claim 8, further comprising:
providing a first control register associated with the memory control system and a second control register associated with the memory control system, the first and second control registers associated with the first and second independently cached areas, respectively, and configured to store one of: a processing unit context type assigned to the associated independently cached area; a memory location of the associated independently cached area in the memory cache; and a size of the associated independently cached area in the memory cache.

14. The method according to claim 13, further comprising:
controlling assertion of a flag in each of the first and second control registers, the first number of data packets being prohibited from entering the second independently cached area and the second number of data packets from entering the first independently cached area based on an assertion status of the flag.

15. A computer system, comprising:
a bus;
a central processing unit coupled to the bus;
a system memory coupled to the central processing unit;
a memory cache coupled to the central processing unit, the memory cache arrangeable to comprise:
a first independently cached area assigned to store a first number of data packets associated with a first process executable by the central processing unit; and
a second independently cached area assigned to store a second number of data packets associated with a second process executable by the central processing unit; and
a memory control system coupled to the memory cache, the memory control system configured to arrange the first independently cached area and the second independently cached area in such a manner that the first number of data packets and the second number of data packets coexisting in the memory cache
wherein the first independently cached area is configurable in such a manner that at least some of the first number of data packets are transferable from the first independently cached area in response to execution of the first process by the central processing unit, and wherein the second independently cached area is configurable in such a manner that at least some of the second number of data packets are transferable from the second independently cached area in response to execution of the second process by the central processing unit.

16. The computer system according to claim 15, further comprising:
a plurality of instructions executable by the central processing unit to perform a method comprising:
alternately executing the first process and the second process, the first number of data packets and the second number or data packets coexisting in the memory cache and being concurrently available for transfer between the memory cache and the central processing unit.

17. The computer system according to claim 16, wherein the memory control system comprises:
a first control register associated with the first independently cached area; and
a second control register associated with the second independently cached area,
the first and second control registers configured to store one of: a process identifier assigned to the associated independently cached area; a memory location of the associated independently cached area in the memory cache; and a size of the associated independently cached area in the memory cache.

18. A processing unit, comprising:
- a central processing engine operative to alternately execute a first process and a second process; and
- a memory control interface to communicate with the central processing engine, the memory control interface operative to respond to a memory cache, the memory cache arrangeable to comprise:
- a first independently cached area assigned to store a first number of data packets associated with the first process; and
- a second independently cached area assigned to store a second number of data packets associated with the second process, the first number of data packets and the second number of data packets coexisting in the memory cache,
- when alternately executing the first process and the second process, the central processing engine operative to cause the memory control interface to arrange for transfer of the first number of data packets and the second number of data packets, respectively, between the memory cache and the central processing engine, the first number of data packets and the second number of data packets being concurrently available for transfer
- wherein the first independently cached area is configurable in such a manner that at least some of the first number of data packers are transferable from the first independently cached area in response to execution of the first process by the central processing engine, and wherein the second independently cached area is configurable in such a manner that at least some of the second number of data packets are transferable from the second independently cached area in response to execution of the second process by the central processing engine.

* * * * *

UNITED STATES PATENT AND TRADEMARK OFFICE
CERTIFICATE OF CORRECTION

PATENT NO. : 6,976,127 B2 Page 1 of 1
APPLICATION NO. : 10/619045
DATED : December 13, 2005
INVENTOR(S) : Thomas Patrick Dawson It is certified that error appears in the above-identified patent and that said Letters Patent is hereby corrected as shown below:

Col. 2, line 49, before "includes", insert - - unit - -.

Col. 5, line 5, change "textel" to - - texel - -.

Col. 6, line 15, after "cache" (first occurrence) insert - - , - -.

Col. 7, line 32, change "textel" to - - texel - -.

Claim 12, Col. 9, line 60, before "least" insert -- at --.

Claim 15, Col. 10, line 35, change "coexisting" to -- coexist --.

Claim 8, Col. 9, line 35, change "rackets" to - - packets - -.

Claim 9, Col. 9, line 48, change "die" to -- the --.

Claim 12, Col. 9, line 56, before last word "data" insert -- of --.

Claim 12, Col. 9, line 60, after "transfer", change "or" to -- of --.

Claim 18, Col. 12, line 8, change "packers" to -- packets --.

Signed and Sealed this

Fifteenth Day of August, 2006

JON W. DUDAS
*Director of the United States Patent and Trademark Office*